United States Patent
Yourou et al.

(10) Patent No.: US 10,994,615 B2
(45) Date of Patent: *May 4, 2021

(54) MOVABLE BODY RESCUE SYSTEM AND MOVABLE BODY RESCUE METHOD

(71) Applicant: TOYOTA JIDOSHA KABUSHIKI KAISHA, Toyota (JP)

(72) Inventors: Katsuhiko Yourou, Toyonaka (JP); Naomi Kataoka, Nagoya (JP); Toshiaki Niwa, Okazaki (JP); Yasuhiro Baba, Kamo-gun (JP); Kazuyuki Kagawa, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 117 days.

This patent is subject to a terminal disclaimer.

(21) Appl. No.: 16/174,735

(22) Filed: Oct. 30, 2018

(65) Prior Publication Data

US 2019/0126756 A1 May 2, 2019

(30) Foreign Application Priority Data

Nov. 1, 2017 (JP) .............................. JP2017-212080

(51) Int. Cl.
*H02J 7/00* (2006.01)
*B60L 3/00* (2019.01)
(Continued)

(52) U.S. Cl.
CPC ............. *B60L 3/0046* (2013.01); *B60L 50/16* (2019.02); *B60L 53/11* (2019.02); *B60L 53/14* (2019.02);
(Continued)

(58) Field of Classification Search
CPC ..... H02J 7/342; H02J 2207/40; H04W 84/18; H04W 12/003; B60L 53/18; B60L 53/53;
(Continued)

(56) References Cited

U.S. PATENT DOCUMENTS

2004/0145241 A1* 7/2004 Arakawa ............... B60R 25/102
307/10.3
2010/0291965 A1 11/2010 Tabe
(Continued)

FOREIGN PATENT DOCUMENTS

JP 2006-113892 A 4/2006
JP 2012230523 A 11/2012
(Continued)

OTHER PUBLICATIONS

An Office Action dated May 29, 2020, which issued during the prosecution of U.S. Appl. No. 16/174,710.
(Continued)

*Primary Examiner* — Binh C Tat
(74) *Attorney, Agent, or Firm* — Sughrue Mion, PLLC (57) ABSTRACT

Each vehicle includes a detection device configured to detect a situation outside the vehicle. When a server receives from a depleted EV a help signal requesting power supply from another vehicle to the depleted EV, the server selects, from among the other vehicles, a rescue EV to supply electric power to the depleted EV. The rescue EV moves to the depleted EV, stops behind the depleted EV detected by the detection device, and supplies power to the depleted EV while being stopped behind the depleted EV.

5 Claims, 9 Drawing Sheets (51) Int. Cl.
*G01C 21/32* (2006.01)
*B60L 50/16* (2019.01)
*B60L 53/22* (2019.01)
*B60L 58/13* (2019.01)
*B60L 53/14* (2019.01)
*B60L 53/65* (2019.01)
*B60L 53/30* (2019.01)
*B60L 53/10* (2019.01)
*B60L 53/66* (2019.01)
*B60L 53/57* (2019.01)
*B60L 53/68* (2019.01)
*B60L 53/62* (2019.01)

(52) U.S. Cl.
CPC .............. *B60L 53/22* (2019.02); *B60L 53/305* (2019.02); *B60L 53/57* (2019.02); *B60L 53/62* (2019.02); *B60L 53/65* (2019.02); *B60L 53/66* (2019.02); *B60L 53/68* (2019.02); *B60L 58/13* (2019.02); *G01C 21/32* (2013.01); *B60L 2240/12* (2013.01); *B60L 2240/622* (2013.01); *B60L 2240/72* (2013.01); *B60L 2250/16* (2013.01)

(58) Field of Classification Search
CPC .... B60L 2240/622; B60L 53/65; B60L 53/66; B60W 10/20

USPC .................................................. 320/126–136
See application file for complete search history.

(56) References Cited

U.S. PATENT DOCUMENTS

| | | |
|---|---|---|
| 2012/0303397 A1 | 11/2012 | Prosser |
| 2014/0021908 A1 | 1/2014 | McCool et al. |
| 2014/0184165 A1 | 7/2014 | Takahashi et al. |
| 2015/0091531 A1* | 4/2015 | Hyde .................. G06Q 10/105 320/137 |

FOREIGN PATENT DOCUMENTS

| | | |
|---|---|---|
| JP | 2013130963 A | 7/2013 |
| JP | 2016192028 A | 11/2016 |

OTHER PUBLICATIONS

An Office Action dated Jun. 1, 2020, which issued during the prosecution of U.S. Appl. No. 16/174,983.

Notice of Allowance dated Nov. 25, 2020, from the United States Patent and Trademark Office in U.S. Appl. No. 16/174,710.

Notice of Allowance dated Nov. 25, 2020, from the United States Patent and Trademark Office in U.S. Appl. No. 16/174,983.

* cited by examiner

<VEHICLE INFORMATION>

| VEHICLE ID | OWNER | VEHICLE TYPE | CURRENT LOCATION | SOC | HELP SIGNAL | REQUESTED POWER AMOUNT | RESCUE INTENTION | POSSIBLE POWER SUPPLY AMOUNT | POSSIBILITY OF EXTERNAL POWER SUPPLY | VEHICLE SITUATION |
|---|---|---|---|---|---|---|---|---|---|---|
| E001 | A | T1 | X1 | 0% | ○ | P1 | | | | DEPLETED |
| E002 | B | T2 | X2 | 60% | | | ○ | P2 | ○ | RESCUING |
| E003 | C | T3 | X3 | 70% | | | ○ | P3 | ○ | |
| E004 | D | T4 | X4 | 80% | | | | | ○ | |
| ... | ... | ... | ... | ... | ... | ... | ... | ... | ... | ... |
| ... | ... | ... | ... | ... | ... | ... | ... | ... | ... | ... |

MOVABLE BODY RESCUE SYSTEM AND MOVABLE BODY RESCUE METHOD

This nonprovisional application is based on Japanese Patent Application No. 2017-212080 filed on Nov. 1, 2017 with the Japan Patent Office, the entire contents of which are hereby incorporated by reference.

BACKGROUND

Field

The present disclosure relates to a movable body rescue system and a movable body rescue method, and particularly to a system for rescuing a movable body equipped with a power storage device storing electric power for traveling, and a method for rescuing the movable body.

Description of the Background Art

Japanese Patent Laying-Open No. 2006-113892 discloses an automatic running management system that allows an electric vehicle with a low state of charge of a power storage device storing electric power for traveling to reliably reach a charging location.

In this automatic running management system, when it is determined that the state of charge of the power storage device is equal to or lower than a prescribed value, a charging station reservation is made, and location information of the charging station is provided to the electric vehicle. A controller of the electric vehicle causes automatic running of the electric vehicle to the charging station by automatic driving based on the provided location information of the charging station and a car navigation device (see Japanese Patent Laying-Open No. 2006-113892).

However, depending on the state of charge of the power storage device, and the location of the charging station having power supply equipment capable of charging the power storage device, it may be impossible for the electric vehicle to even reach the nearest charging station.

SUMMARY

The present disclosure has been made to solve the aforementioned problem, and has an object to provide a system for rescuing a movable body having a power storage device that can be charged without travel to a charging station, and a method for rescuing the movable body.

A movable body rescue system of the present disclosure includes: a first movable body equipped with a first power storage device storing electric power for traveling; a plurality of second movable bodies each equipped with a second power storage device storing electric power for traveling; and a server configured to communicate with the first movable body and the plurality of second movable bodies. The first movable body is configured such that the first power storage device can be charged by receiving electric power from any one of the plurality of second movable bodies. Each of the second movable bodies is configured to supply electric power stored in the second power storage device to the first movable body. Each of the second movable bodies includes a detection device configured to detect a situation outside the second movable body. When the server receives from the first movable body a help signal requesting power supply from any one of the plurality of second movable bodies to the first movable body, the server is configured to select, from among the plurality of second movable bodies, a power-supplying movable body (rescue EV) to supply electric power to the first movable body. The power-supplying movable body is configured to move to the first movable body, stop behind the first movable body detected by the detection device, and supply electric power to the first movable body while being stopped behind the first movable body.

With the configuration as described above, the power-supplying movable body (rescue EV) selected from among the plurality of second movable bodies can be moved to the first movable body that has issued the help signal (depleted EV), to supply power from the power-supplying movable body to the first movable body. According to this movable body rescue system, therefore, the first power storage device equipped on the first movable body can be charged without the first movable body traveling to a charging station. Moreover, according to this rescue system, power supply to the first movable body is performed while the power-supplying movable body is stopped behind the first movable body. Thus, a risk that the first movable body receiving the power will get hit from behind can be reduced.

Each of the second movable bodies may be configured to transmit to the server a signal indicating whether or not the second movable body can supply electric power to the first movable body (rescue intention signal). When the server receives the help signal from the first movable body, the server may be configured to select the power-supplying movable body from among second movable bodies each indicating by the signal its ability to supply electric power to the first movable body.

Accordingly, the selection of a second movable body incapable of supplying power to the first movable body as the power-supplying movable body can be avoided.

When the server receives the help signal from the first movable body, the server may be configured to select a second movable body closest to the first movable body of the plurality of second movable bodies as the power-supplying movable body.

Accordingly, the power-supplying movable body can be moved in the shortest time possible to the first movable body that has issued the help signal, to supply power from the power-supplying movable body to the first movable body.

When the server receives the help signal from the first movable body, the server may be configured to select, from among the plurality of second movable bodies, a second movable body storing a prescribed and required power amount (possible power supply amount) in the second power storage device as the power-supplying movable body. Here, the required power amount is calculated from a stored power amount of the second power storage device, and a power amount that allows travel from a location of power supply to the first movable body to power supply equipment capable of charging the second power storage device.

Accordingly, a situation where the power-supplying movable body cannot travel to the power supply equipment (charging station) after the completion of the power supply from the power-supplying movable body to the first movable body can be avoided.

A rescue method of the present disclosure is a movable body rescue method used in a system including a first movable body, a plurality of second movable bodies, and a server configured to communicate with the first movable body and the plurality of second movable bodies. The first movable body is equipped with a first power storage device storing electric power for traveling, and is configured such that the first power storage device can be charged by receiving electric power from any one of the plurality of second movable bodies. Each of the second movable bodies is equipped with a second power storage device storing electric power for traveling, and is configured to supply electric power stored in the second power storage device to the first movable body. Each of the second movable bodies includes a detection device configured to detect a situation outside the second movable body. The rescue method includes: when the server receives from the first movable body a help signal requesting power supply from any one of the plurality of second movable bodies to the first movable body, selecting, from among the plurality of second movable bodies, a power-supplying movable body (rescue EV) to supply electric power to the first movable body; moving the power-supplying movable body to the first movable body; stopping the power-supplying movable body behind the first movable body detected by the detection device; and supplying electric power from the power-supplying movable body to the first movable body while the power-supplying movable body is stopped behind the first movable body.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Embodiments of the present disclosure will be described below in detail with reference to the drawings. The same or corresponding parts are designated by the same characters in the drawings and description thereof will not be repeated.

First Embodiment

<System Configuration>

Figure 1:
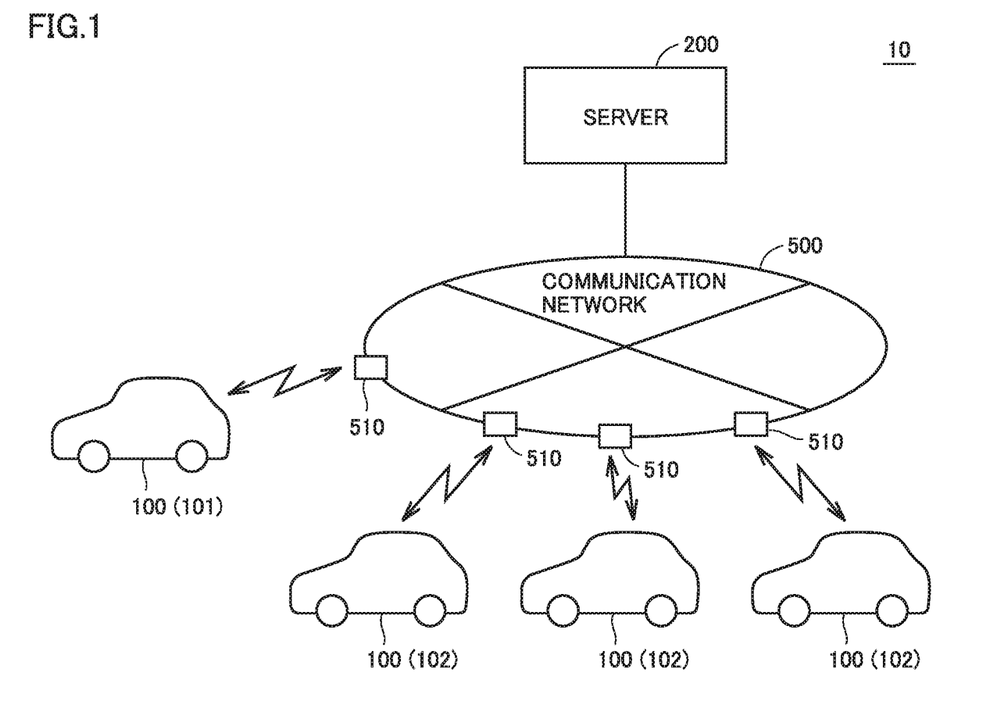
FIG. 1 schematically shows an overall configuration of a movable body rescue system according to a first embodiment.

FIG. 1 schematically shows an overall configuration of a movable body rescue system 10 according to a first embodiment. With reference to FIG. 1, movable body rescue system 10 includes a plurality of electrically powered vehicles (hereinafter also referred to simply as "vehicles") 100 and a server 200. Each vehicle 100 and server 200 are configured to communicate with each other through a communication network 500 such as the Internet or a telephone line. It should be noted that each vehicle 100 is configured to send and receive information to and from a base station 510 of communication network 500 through wireless communication.

Each vehicle 100 is a movable body configured to perform driverless driving. Each vehicle 100 is an electric vehicle (hereinafter also referred to as "EV") capable of generating driving power for traveling using electric power from an equipped power storage device, and allowing the power storage device to be charged using electric power supplied from a power supply external to the vehicle, as will be described later in connection with FIG. 2. Each vehicle 100 is also configured to supply the electric power of the equipped power storage device to a power storage device of another vehicle 100.

Server 200 communicates with each vehicle 100 through communication network 500, and sends and receives various types of information to and from each vehicle 100. The configuration and operation of server 200 will be described in detail later.

Figure 2:
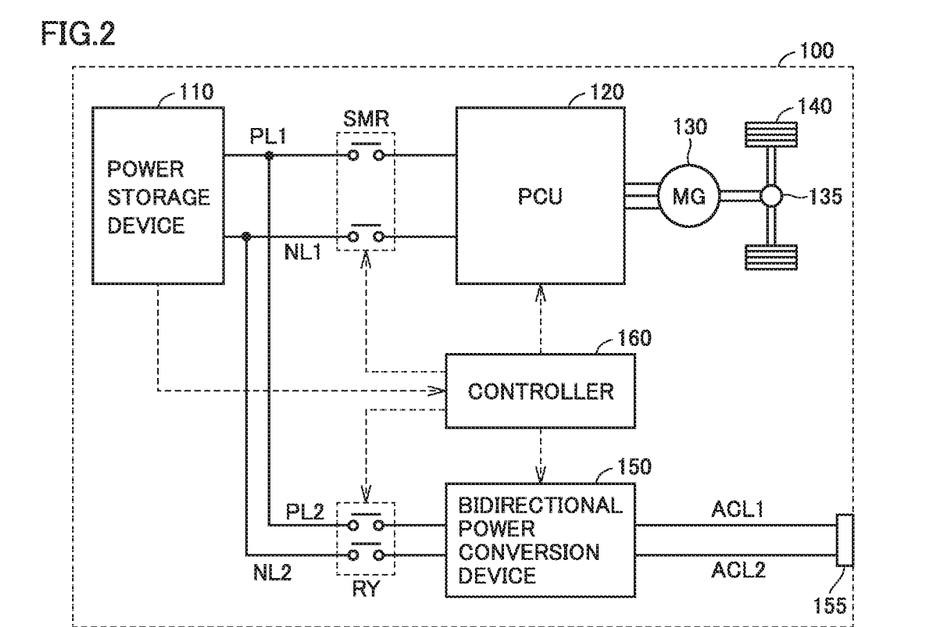
FIG. 2 shows an example configuration of a vehicle.

FIG. 2 shows an example configuration of vehicle 100. With reference to FIG. 2, vehicle 100 includes a power storage device 110, a system main relay SMR, a PCU (Power Control Unit) 120, a motor generator 130, a drive-train gear 135, and a driving wheel 140. Vehicle 100 further includes a bidirectional power conversion device 150, an inlet 155, a charging relay RY, and a controller 160.

Power storage device 110 is an electric power storage component configured to be chargeable/dischargeable. Power storage device 110 is configured to include a secondary battery such as a lithium ion battery or a nickel-metal hydride battery, or include a power storage element such as an electric double layer capacitor, for example. Power storage device 110 outputs, to controller 160, detected values of voltage and current of power storage device 110 detected by sensors not shown in the figure.

PCU 120 is a driving device for driving motor generator 130, and is configured to include a power conversion device such as a converter or an inverter (neither shown). PCU 120 is controlled by controller 160, and converts DC power received from power storage device 110 into AC power for driving motor generator 130.

Motor generator 130 is an AC rotating electrical machine, such as a permanent-magnet type synchronous motor including a rotor having a permanent magnet embedded therein. Output torque from motor generator 130 is transmitted to driving wheel 140 via drive-train gear 135, to cause travel of vehicle 100. Motor generator 130 is also capable of generating electric power using rotation power of driving wheel 140 during braking operation of vehicle 100. The electric power thus generated is converted by PCU 120 into charging power for power storage device 110.

Controller 160 includes an ECU (Electronic Control Unit), various sensors, a navigation device, a communication module and the like (not shown in FIG. 2), receives signals from the various sensors, outputs a control signal to each device, and controls vehicle 100 and each device. Controller 160 also performs various types of control for performing driverless driving of vehicle 100 (such as driving control, braking control, and steering control). Controller 160 also generates control signals for controlling PCU 120, a steering device, a charger and the like (not shown). The configuration of controller 160 will be described in detail later.

Bidirectional power conversion device 150 is connected to power storage device 110 through charging relay RY. Bidirectional power conversion device 150 is also connected to inlet 155 by power lines ACL1 and ACL2. Bidirectional power conversion device 150 is controlled by controller 160, and converts electric power input through inlet 155 into electric power with which power storage device 110 can be charged. Bidirectional power conversion device 150 also converts electric power supplied from power storage device 110 into electric power of a prescribed voltage level, and supplies the power to inlet 155.

In this manner, in vehicle 100, bidirectional power conversion device 150 allows power storage device 110 to be charged using the electric power input through inlet 155, and allows the electric power stored in power storage device 110 to be supplied to the outside of the vehicle through inlet 155. Accordingly, in this movable body rescue system 10, electric power can be supplied from vehicle 100 having a high amount of stored power to depleted vehicle 100.

Figure 3:
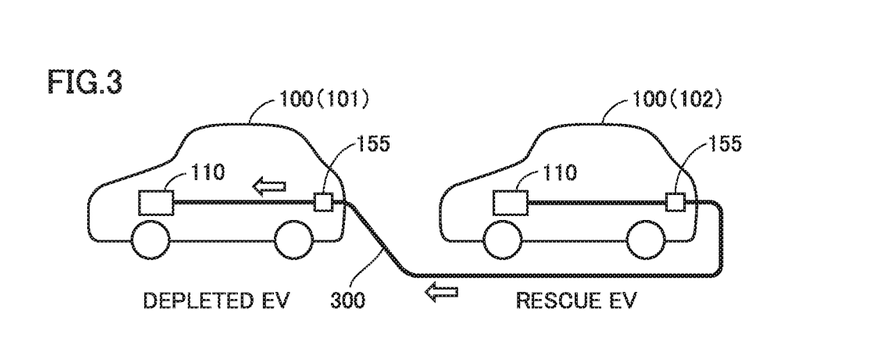
FIG. 3 shows how electric power is supplied to a depleted vehicle from another vehicle.

FIG. 3 shows how electric power is supplied to depleted vehicle 100 from another vehicle 100. With reference to FIG. 3, inlet 155 of vehicle 100 to receive electric power (hereinafter also referred to as "depleted EV 101") and inlet 155 of vehicle 100 to supply electric power (hereinafter also referred to as "rescue EV 102") are connected together through a power cable 300.

Then, electric power is supplied from power storage device 110 of rescue EV 102 to power storage device 110 of depleted EV 101 through power cable 300. Accordingly, power storage device 110 of rescue EV 102 is discharged, and power storage device 110 of depleted EV 101 is charged.

Although each vehicle 100 includes bidirectional power conversion device 150 in the above description, depleted EV 101 to receive power supply from rescue EV 102 may include, instead of bidirectional power conversion device 150, a charger having only the function of converting the electric power input through inlet 155 into charging power for power storage device 110. Rescue EV 102 to supply power to depleted EV 101 may include, instead of bidirectional power conversion device 150, a power supply device having only the function of converting the electric power stored in power storage device 110 and supplying the power to inlet 155.

Figure 4:
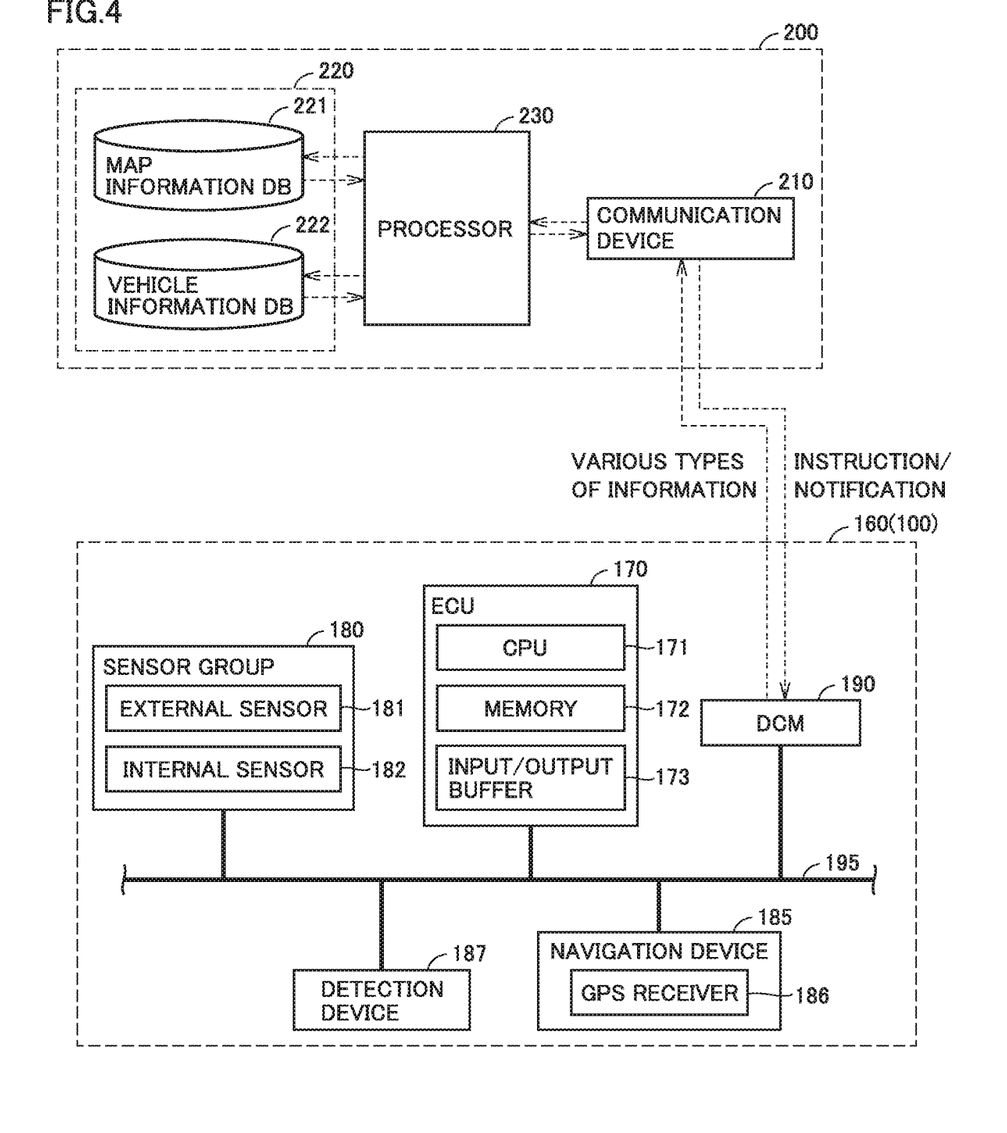
FIG. 4 shows configurations of a controller of the vehicle and a server in further detail.

FIG. 4 shows configurations of controller 160 of vehicle 100 and server 200 in further detail. With reference to FIG. 4, controller 160 of vehicle 100 includes an ECU 170, a sensor group 180, a navigation device 185, a detection device 187, and a communication module 190. ECU 170, sensor group 180, navigation device 185, detection device 187, and communication module 190 are connected to one another via an in-vehicle wired network 195 such as a CAN (Controller Area Network).

ECU 170 is configured to include a CPU (Central Processing Unit) 171, a memory 172, and an input/output buffer 173. In response to a signal from each sensor of sensor group 180, ECU 170 controls devices to bring vehicle 100 into a desired state. For example, in a driverless mode in which vehicle 100 is caused to travel by driverless driving, ECU 170 performs various types of control for implementing driverless driving of vehicle 100 by controlling PCU 120 (FIG. 2) serving as a driving device and the steering device (not shown). ECU 170 also receives detected values of voltage and current of power storage device 110, and calculates a SOC (State Of Charge) of power storage device 110 based on these detected values.

It should be noted that "driverless driving" in the driverless mode refers to driving in which driving operations of vehicle 100 such as acceleration, deceleration, and steering are performed without a driver's driving operations. Specifically, this vehicle 100 is configured to perform fully automatic driving defined as "Level 5". That is, in the driverless driving by ECU 170, a driver is not required to ride on the vehicle under any situation.

Therefore, controller 160 includes sensor group 180 to detect situations inside and outside vehicle 100. Sensor group 180 includes an external sensor 181 configured to detect a situation outside vehicle 100, and an internal sensor 182 configured to detect information corresponding to a traveling state of vehicle 100 and detect a steering operation, an accelerating operation, and a braking operation.

External sensor 181 includes a camera, a radar, a LIDAR (Laser Imaging Detection And Ranging) and the like, for example (neither shown). The camera captures an image of a situation outside vehicle 100 and outputs, to ECU 170, captured image information regarding the situation outside vehicle 100. The radar transmits electric waves (for example, millimeter waves) to the surroundings of vehicle 100, and receives electric waves reflected by an obstacle to detect the obstacle. Then, the radar outputs, to ECU 170, a distance to the obstacle and a direction of the obstacle as obstacle information regarding the obstacle. The LIDAR transmits light (typically, ultraviolet rays, visible rays, or near infrared rays) to the surroundings of vehicle 100, and receives light reflected by an obstacle to measure a distance to the reflecting point and detect the obstacle. The LIDAR outputs, to ECU 170, the distance to the obstacle and a direction of the obstacle as obstacle information, for example.

Internal sensor 182 includes a vehicle speed sensor, an acceleration sensor, a yaw rate sensor and the like, for example (neither shown). The vehicle speed sensor is provided on a wheel of vehicle 100 or a drive shaft that is rotated together with the wheel, detects a rotating speed of the wheel, and outputs vehicle speed information including the speed of vehicle 100 to ECU 170. The acceleration sensor includes a forward/backward acceleration sensor to detect acceleration in a forward/backward direction of vehicle 100, and a lateral acceleration sensor to detect lateral acceleration of vehicle 100, for example. The acceleration sensor outputs acceleration information including both accelerations to ECU 170. The yaw rate sensor detects a yaw rate (rotation angle speed) around the vertical axis of the center of gravity of vehicle 100. The yaw rate sensor is a gyro sensor, for example, and outputs yaw rate information including the yaw rate of vehicle 100 to ECU 170.

Navigation device 185 includes a GPS receiver 186 to specify a location of vehicle 100 based on electric waves from artificial satellites (not shown). Navigation device 185 performs various types of navigation processes of vehicle 100 using the location information (GPS information) of vehicle 100 specified by GPS receiver 186. Specifically, navigation device 185 calculates a traveling route (expected traveling route or target route) from the current location of vehicle 100 to a destination based on the GPS information of vehicle 100 and road map data stored in the memory (not shown), and outputs information of the target route to ECU 170. It should be noted that navigation device 185 notifies the target route to the user by way of presentation on a display and audio output from a speaker (neither shown).

Detection device 187 is configured to include a camera or a LIDAR, for example, and detects a situation outside vehicle 100. For example, detection device 187 can detect other vehicles located around vehicle 100. Then, detection device 187 outputs a result of the detection to ECU 170. It should be noted that a camera or a LIDAR included in external sensor 181 of sensor group 180 may be used as detection device 187.

Communication module 190 is an in-vehicle DCM (Data Communication Module), and is configured to perform bidirectional data communication with communication device 210 of server 200 through communication network 500 (FIG. 1).

Server 200 includes a communication device 210, a storage device 220, and a processor 230. Communication device 210 is configured to perform bidirectional data communication with communication module 190 of vehicle 100 through communication network 500 (FIG. 1).

Storage device 220 includes a map information database (DB) 221 and a vehicle information database (DB) 222. Map information DB 221 stores data on map information. Vehicle information DB 222 stores information of each vehicle 100 utilized in this movable body rescue system 10. Each vehicle 100 to be utilized in movable body rescue system 10 can be utilized in movable body rescue system 10 through a registration procedure in advance. Information of vehicle 100 thus registered is stored in vehicle information DB 222. A data configuration of vehicle information DB 222 will be described later.

When a help signal requesting power supply from another vehicle 100 is received from depleted EV 101, processor 230 selects, based on the vehicle information stored in vehicle information DB 222, rescue EV 102 to supply power to depleted EV 101 from among a plurality of vehicles 100 (excluding depleted EV 101). Then, processor 230 notifies selected rescue EV 102 of a rescue request to move to depleted EV 101.

<Method for Rescuing Depleted EV 101>

When the SOC of power storage device 110 decreases, vehicle 100, which is an EV, can travel to a charging station having power supply equipment and have power storage device 110 charged by the power supply equipment. However, depending on the SOC of power storage device 110 and the location of the charging station capable of charging power storage device 110, it may be impossible for vehicle 100 to even reach the nearest charging station.

Thus, in this first embodiment, a system is provided in which, when a help signal requesting power supply from another vehicle 100 is issued from depleted EV 101, rescue EV 102 is selected from among the plurality of vehicles 100, to allow power supply from selected rescue EV 102 to depleted EV 101. Such a system allows power storage device 110 equipped on depleted EV 101 to be charged using rescue EV 102, without depleted EV 101 traveling to a charging station.

Moreover, in this first embodiment, when rescue EV 102 moves to depleted EV 101, rescue EV 102 stops behind depleted EV 101 detected by detection device 187, and supplies power to depleted EV 101 while being stopped behind depleted EV 101. Accordingly, a risk that depleted EV 101 receiving the power will get hit from behind can be reduced.

Figure 5:
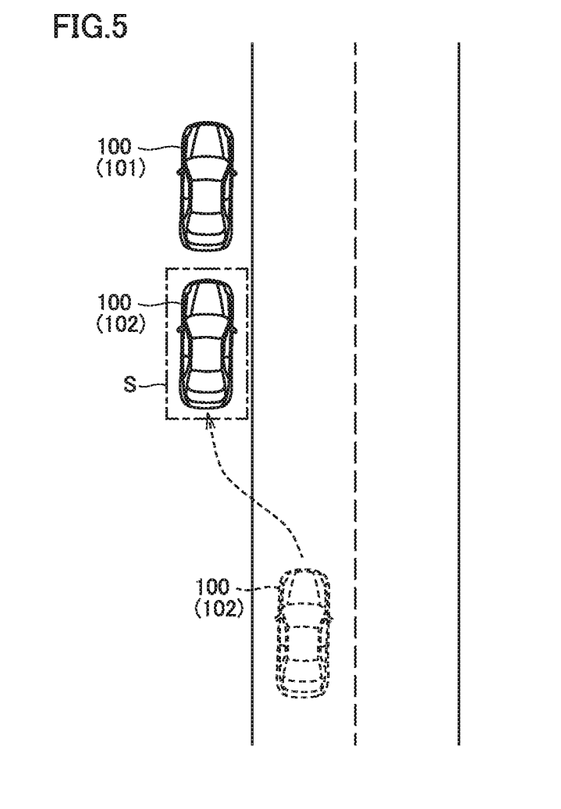
FIG. 5 shows a stopping position of a rescue EV that has moved to a depleted EV.

FIG. 5 shows a stopping position of rescue EV 102 that has moved to depleted EV 101. With reference to FIG. 5, when rescue EV 102 approaches depleted EV 101 and depleted EV 101 is detected by detection device 187 (FIG. 4) of rescue EV 102, rescue EV 102 stops in a space S behind depleted EV 101 using the detected image from detection device 187.

It should be noted that the stopping of rescue EV 102 into space S using detection device 187 can be implemented using various types of known parking assistance systems. After the stopping of rescue EV 102, the connection between rescue EV 102 and depleted EV 101 by power cable 300 is made by a user of depleted EV 101, or a user of rescue EV 102 (if the user is onboard).

The details of control in movable body rescue system 10 according to the first embodiment are described below.

Figure 6:
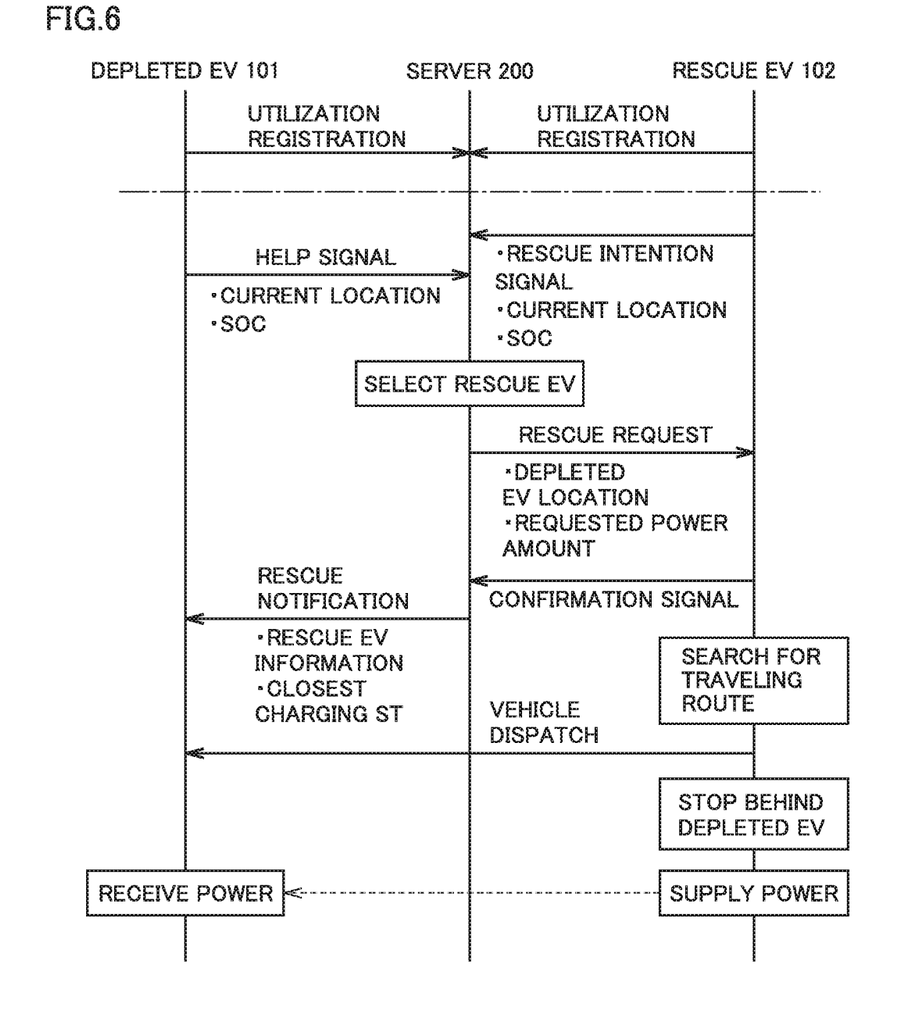
FIG. 6 is a sequence diagram showing exchange of information among respective elements of the movable body rescue system according to the first embodiment.

FIG. 6 is a sequence diagram showing exchange of information among respective elements (depleted EV 101, rescue EV 102 and server 200) of movable body rescue system 10 according to the first embodiment. Although FIG. 6 shows only depleted EV 101 and rescue EV 102 as vehicles 100 to facilitate understanding, there are actually a plurality of potential vehicles 100 for rescue EV 102.

With reference to FIG. 6, depleted EV 101 and rescue EV 102 need to make a utilization registration in advance. Pieces of information of depleted EV 101 and rescue EV 102 (owners, vehicle types, etc.) are registered with server 200 by the advance utilization registration.

When rescue EV 102 receives a rescue request (power supply request) for another vehicle 100, rescue EV 102 transmits to server 200 a signal indicating whether or not rescue EV 102 can perform a rescue (power supply) (rescue intention signal). Rescue EV 102 also transmits to server 200 information indicating the current location and the SOC of power storage device 110 of rescue EV 102. The rescue intention signal, as well as the information indicating the current location and the SOC are regularly transmitted from rescue EV 102 to server 200, and are stored in vehicle information DB 222 of server 200.

When the SOC of power storage device 110 equipped on depleted EV 101 falls below a prescribed value, depleted EV 101 transmits to server 200 a help signal requesting power supply from another vehicle 100. Depleted EV 101 also transmits to server 200, together with the help signal, information indicating the current location and the SOC of power storage device 110 of depleted EV 101.

When server 200 receives the help signal from depleted EV 101, server 200 refers to the information of each vehicle 100 stored in vehicle information DB 222, and selects rescue EV 102 to move to depleted EV 101 and supply power to depleted EV 101 from among the plurality of vehicles 100. Then, server 200 transmits a rescue request (request for power supply to depleted EV 101) to selected rescue EV 102. This rescue request includes the location information of depleted EV 101, information of a requested power amount indicating an amount of power to be supplied to depleted EV 101, and the like.

Rescue EV 102 that has received the rescue request (power supply request) from server 200 transmits a confirmation signal indicating that rescue EV 102 can perform a rescue to server 200, and searches for a traveling route from the current location of rescue EV 102 to the location of depleted EV 101 based on the location information of depleted EV 101.

When server 200 receives the confirmation signal from rescue EV 102, on the other hand, server 200 transmits a notification of rescue by rescue EV 102 to depleted EV 101. This rescue notification includes information of rescue EV 102 (information specifying rescue EV 102 such as vehicle type, an amount of power that can be supplied from rescue EV 102, etc.), location information about a charging station around the current location of depleted EV 101, and the like.

When the traveling route to the location of depleted EV 101 is searched, rescue EV 102 moves to depleted EV 101 in accordance with the searched traveling route (vehicle dispatch). Specifically, rescue EV 102 moves to depleted EV 101 by driverless driving in accordance with the searched traveling route in the driverless mode, and moves to depleted EV 101 by a driver's driving in accordance with the traveling route displayed on a display screen of navigation device 185 (FIG. 4) in a driver-operated mode.

Then, rescue EV 102 approaches depleted EV 101, and stops behind depleted EV 101 detected by detection device 187 of rescue EV 102. When rescue EV 102 stops behind depleted EV 101, rescue EV 102 performs power supply to depleted EV 101 through power cable 300 connected between depleted EV 101 and rescue EV 102 by the user of depleted EV 101 or rescue EV 102. On the other hand, depleted EV 101 performs power reception from rescue EV 102 (charging of power storage device 110 equipped on depleted EV 101) through power cable 300.

Figure 7:
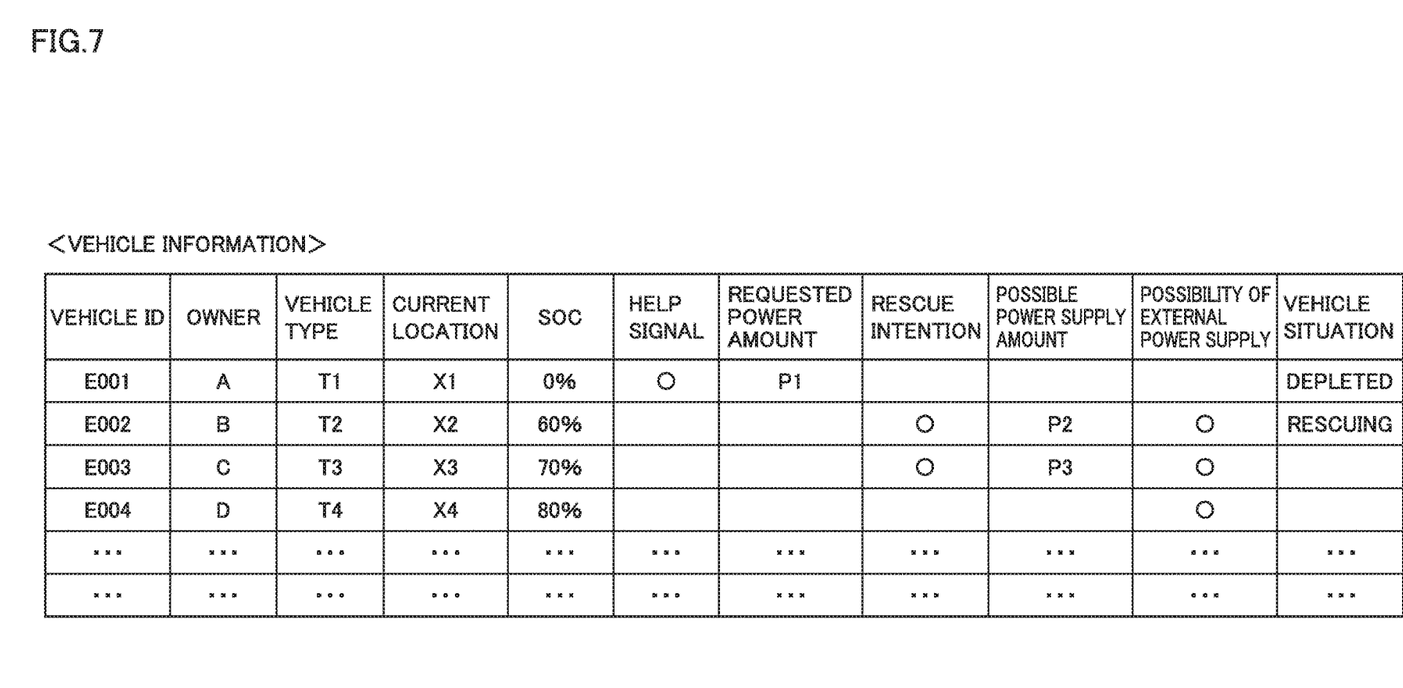
FIG. 7 shows a configuration of data stored in a vehicle information DB of the server.

FIG. 7 shows a configuration of the data stored in vehicle information DB 222 of server 200. With reference to FIG. 7, a vehicle ID is an identification number for specifying vehicle 100. Various types of data indicating the owner, vehicle type, current location, SOC, whether or not a help signal is being received, requested power amount, presence or absence of a rescue intention, possible power supply amount, possibility of external power supply, vehicle situation and the like of that vehicle 100 are associated with the vehicle ID.

In vehicle information DB 222, the current location indicates the current location of vehicle 100. The SOC indicates the SOC of power storage device 110 equipped on vehicle 100. The current location and the SOC are regularly transmitted from each vehicle 100 to server 200 moment by moment while the system of each vehicle 100 is activated, and are stored in vehicle information DB 222.

The help signal indicates whether or not a help signal is being received from vehicle 100. The requested power amount indicates a power amount requested by vehicle 100 issuing the help signal (depleted EV 101). The requested power amount may be set depending on the vehicle type, or may be set during the advance utilization registration, for example. FIG. 7 shows, as an example, that the help signal is being received from vehicle 100 having a vehicle ID of E001, and power supply of a power amount P1 is being requested for that vehicle 100 (depleted EV 101).

The rescue intention indicates whether or not a rescue intention signal is being received from vehicle 100. As described above, the rescue intention signal is a signal indicating whether or not a rescue (power supply) is possible when the rescue request (power supply request) for another vehicle 100 is received. FIG. 7 shows, as an example, that the rescue intention signal is being received from each of vehicles 100 having vehicle IDs of E002 and E003.

The possible power supply amount indicates an amount of power that can be supplied by vehicle 100 issuing the rescue intention signal to another vehicle 100. The possible power supply amount may be set during the advance utilization registration, or may be received moment by moment from vehicle 100 issuing the rescue intention signal.

The possibility of external power supply indicates whether or not the electric power stored in power storage device 110 can be supplied to another vehicle 100. Specifically, vehicle 100 equipped with bidirectional power conversion device 150 would be a vehicle capable of performing external power supply, and vehicle 100 equipped with a charger having only the function of charging power storage device 110, instead of bidirectional power conversion device 150, would be a vehicle incapable of performing external power supply. In FIG. 7, as an example, each of vehicles 100 having vehicle IDs of E002 to E004 is a vehicle equipped with bidirectional power conversion device 150 and capable of performing external power supply, and vehicle 100 having a vehicle ID of E001 (depleted EV 101) is a vehicle equipped with a charger not having the external power supply function and incapable of performing external power supply. It should be noted that information about this possibility of external power supply may be set during the utilization registration of vehicle 100.

The vehicle situation includes data about whether vehicle 100 is being depleted or is rescuing. FIG. 7 shows, as an example, that vehicle 100 having a vehicle ID of E001 and issuing the help signal is being depleted, and vehicle 100 having a vehicle ID of E002 of vehicles 100 capable of performing external power supply is rescuing depleted vehicle 100 (depleted EV 101).

Figure 8:
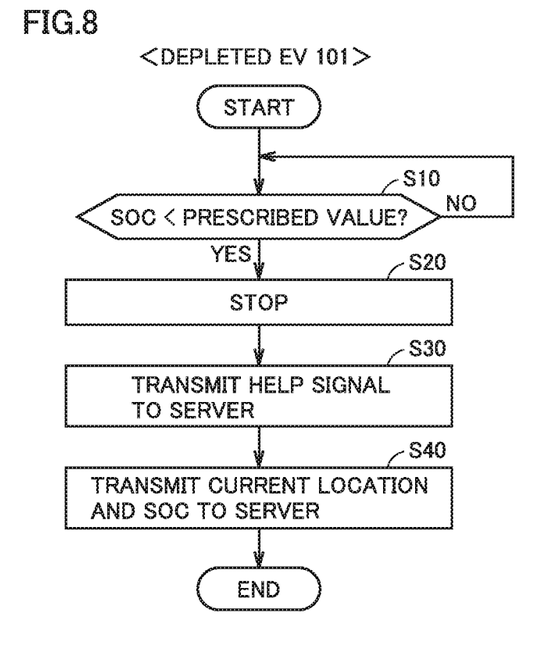
FIG. 8 is a flowchart for illustrating a procedure of processes performed by a controller of the depleted EV.

FIG. 8 is a flowchart for illustrating a procedure of processes performed by controller 160 of depleted EV 101. With reference to FIG. 8, controller 160 of depleted EV 101 determines whether or not the SOC of power storage device 110 has fallen below a prescribed value (step S10). This prescribed value is set to an SOC value at which the vehicle will be unable to travel soon due to a decrease in SOC. When it is determined that the SOC is below the prescribed value (YES in step S10), controller 160 causes the vehicle to stop (step S20).

Next, controller 160 transmits to server 200 a help signal requesting power supply from another vehicle 100 (step S30). Moreover, controller 160 acquires current location information of this vehicle (depleted EV 101) by navigation device 185, calculates the SOC of power storage device 110, and transmits the respective pieces of information indicating the current location and the SOC to server 200 (step S40).

It should be noted that the timing of the transmission of the help signal, as well as the respective pieces of information indicating the current location and the SOC of the vehicle to server 200 may be after the determination that the SOC is below the prescribed value in step S10, and before the vehicle is stopped in step S20.

Figure 9:
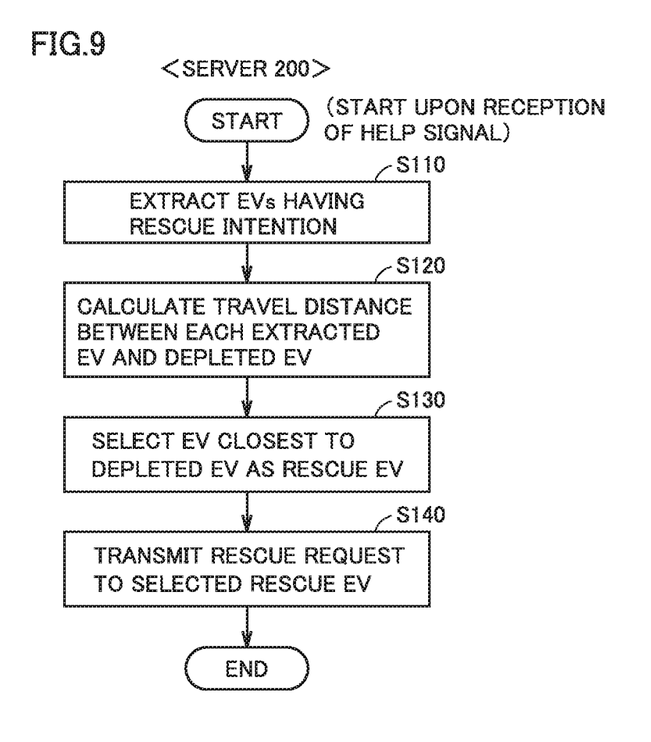
FIG. 9 is a flowchart for illustrating a procedure of processes performed by a processor of the server.

FIG. 9 is a flowchart for illustrating a procedure of processes performed by processor 230 of server 200. The series of processes shown in this flowchart is started when server 200 receives a help signal from depleted EV 101.

With reference to FIG. 9, when server 200 (processor 230) receives the help signal from depleted EV 101, server 200 (processor 230) associates the help signal with the vehicle ID of depleted EV 101, and stores the fact that the help signal has been received in vehicle information DB 222. Server 200 also associates the respective pieces of information indicating the current location and the SOC of power storage device 110 of depleted EV 101, which are received together with the help signal from depleted EV 101, with the vehicle ID of depleted EV 101, and stores them in vehicle information DB 222.

Then, server 200 refers to vehicle information DB 222, and extracts vehicles 100 indicating a rescue intention (excluding depleted EV 101) (step S110). Next, with regard to each extracted vehicle 100, server 200 reads from vehicle information DB 222 the current location of this vehicle 100, and the current location of vehicle 100 issuing the help signal (depleted EV 101). Then, server 200 refers to map information DB 221, and calculates a travel distance between each extracted vehicle 100 and depleted EV 101 (step S120).

Based on the calculated travel distance between each vehicle 100 and depleted EV 101, server 200 selects vehicle 100 located closest to depleted EV 101 (vehicle 100 having the shortest travel distance to depleted EV 101) as rescue EV 102 to supply power to depleted EV 101 (step S130). Accordingly, rescue EV 102 can be dispatched to depleted EV 101 in a short period of time while power consumption of rescue EV 102 moving to supply power to depleted EV 101 is suppressed.

Then, server 200 transmits a rescue request (power supply request) to selected rescue EV 102 (step S140). On this occasion, server 200 reads from vehicle information DB 222 the respective pieces of information indicating the location information and the requested power amount of depleted EV 101, and transmits them together with the rescue request to rescue EV 102.

Figure 10:
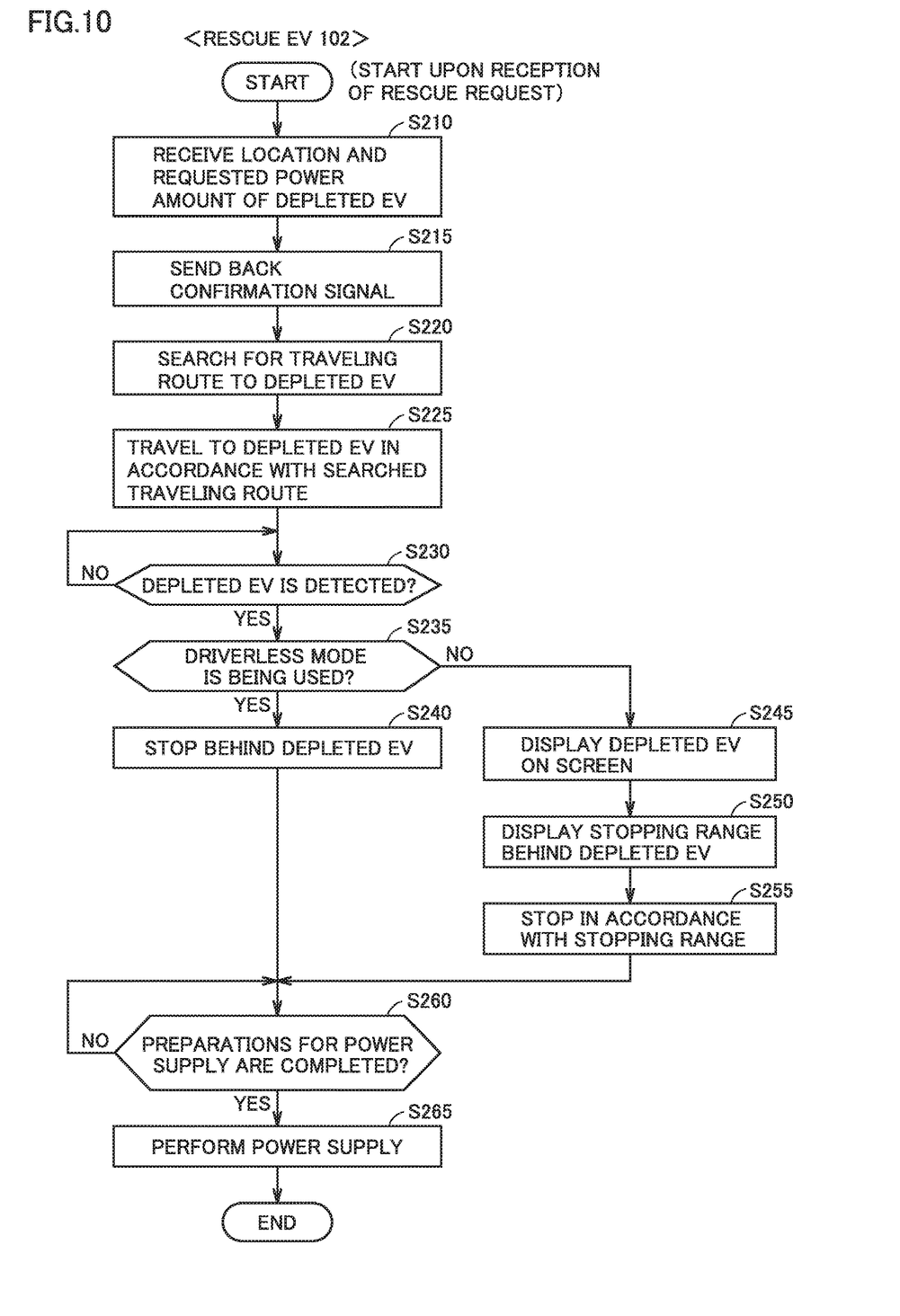
FIG. 10 is a flowchart for illustrating a procedure of processes performed by a controller of the rescue EV.

FIG. 10 is a flowchart for illustrating a procedure of processes performed by controller 160 of rescue EV 102. The series of processes shown in this flowchart is started when rescue EV 102 receives a rescue request from server 200.

With reference to FIG. 10, controller 160 of rescue EV 102 receives from server 200, together with the rescue request, the respective pieces of information indicating the location of depleted EV 101 and the requested power amount showing an amount of power to be supplied to depleted EV 101 (step S210). Then, controller 160 sends back a signal indicating confirmation of the rescue request to server 200 (step S215).

Then, based on the location information of depleted EV 101 received together with the rescue request in step S210, controller 160 searches for a traveling route to depleted EV 101 using navigation device 185 (step S220). Then, rescue EV 102 travels to depleted EV 101 in accordance with the searched traveling route (step S225). Specifically, in the driverless mode, controller 160 controls rescue EV 102 such that rescue EV 102 travels in accordance with the searched traveling route. In the driver-operated mode, controller 160 causes the searched traveling route to be displayed on the display screen of navigation device 185, and the driver drives rescue EV 102 such that rescue EV 102 travels in accordance with the displayed traveling route.

When rescue EV 102 approaches depleted EV 101 and depleted EV 101 is detected by detection device 187 of rescue EV 102 (YES in step S230), controller 160 determines whether or not the driverless mode is being used (step S235).

When the driverless mode is being used (YES in step S235), controller 160 controls rescue EV 102 such that rescue EV 102 stops behind depleted EV 101 detected by detection device 187 (step S240).

When the driver-operated mode is being used (NO in step S235), controller 160 causes an image of depleted EV 101 detected by detection device 187 to be displayed on the display screen of navigation device 185 (step S245). Moreover, controller 160 causes a stopping range for guiding and stopping rescue EV 102 behind depleted EV 101 to be displayed on the display screen of navigation device 185 (step S250). Then, controller 160 controls rescue EV 102 such that rescue EV 102 stops within the displayed stopping range (step S255). It should be noted that the movement of rescue EV 102 into the stopping range may be performed by a driver's driving.

When rescue EV 102 stops behind depleted EV 101, controller 160 determines whether or not preparations for power supply from rescue EV 102 to depleted EV 101 have been completed (step S260). When the connection between rescue EV 102 and depleted EV 101 by power cable 300 (FIG. 3) is confirmed, for example, it can be determined that the preparations for power supply have been completed. When it is determined that the preparations for power supply have been completed (YES in step S260), controller 160 performs power supply to depleted EV 101 through power cable 300 by controlling bidirectional power conversion device 150 (step S265).

Although each vehicle 100 is configured to perform driverless driving in the above description, each vehicle 100 is not necessarily required to be a vehicle capable of driverless driving. When rescue EV 102 is not a vehicle capable of driverless driving, step S235 and step S240 are omitted in FIG. 10, and when depleted EV 101 is detected in step S230 (YES in step S230), the process proceeds to step S245.

As described above, according to this first embodiment, rescue EV 102 selected from among the plurality of vehicles 100 can be moved to depleted EV 101 that has issued the help signal, to supply power from rescue EV 102 to depleted EV 101. According to this first embodiment, therefore, power storage device 110 equipped on depleted EV 101 can be charged without depleted EV 101 traveling to a charging station.

According to this first embodiment, the power supply to depleted EV 101 is performed while rescue EV 102 is stopped behind depleted EV 101. Thus, a risk that depleted EV 101 receiving the power will get hit from behind can be reduced.

According to this first embodiment, rescue EV 102 is selected from among vehicles 100 indicating that they can supply power to depleted EV 101 by the rescue intention signal indicating whether or not vehicle 100 can supply power to depleted EV 101. Thus, the selection of vehicle 100 incapable of supplying power to depleted EV 101 as rescue EV 102 can be avoided.

According to this first embodiment, vehicle 100 closest to depleted EV 101 of the plurality of vehicles 100 is selected as rescue EV 102. Thus, rescue EV 102 can be moved in the shortest time possible to depleted EV 101 that has issued the help signal, to supply power from rescue EV 102 to depleted EV 101.

Second Embodiment

In the first embodiment described above, vehicle 100 closest to depleted EV 101 is selected as rescue EV 102. In this second embodiment, rescue EV 102 is selected in consideration of the location of a charging station around depleted EV 101, such that rescue EV 102 can travel to the nearby charging station after the power supply from rescue EV 102 to depleted EV 101.

An overall configuration of a movable body rescue system according to this second embodiment is the same as that of movable body rescue system 10 according to the first embodiment shown in FIG. 1.

Figure 11:
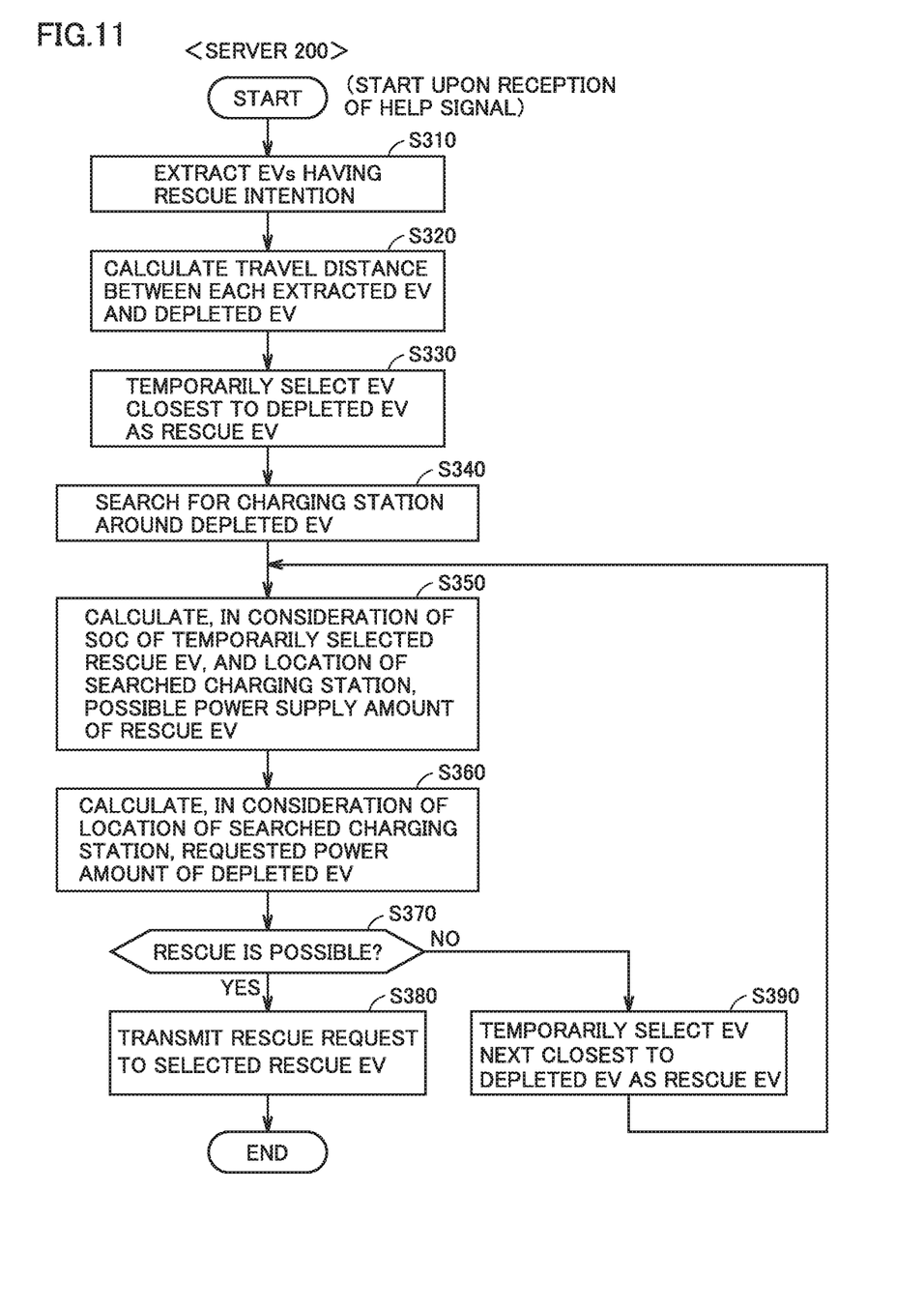
FIG. 11 is a flowchart for illustrating a procedure of processes performed by the processor of the server in a second embodiment.

FIG. 11 is a flowchart for illustrating a procedure of processes performed by processor 230 of server 200 in the second embodiment. The series of processes shown in this flowchart is also started when server 200 receives a help signal from depleted EV 101.

With reference to FIG. 11, when server 200 (processor 230) receives the help signal from depleted EV 101, server 200 (processor 230) refers to vehicle information DB 222, and extracts vehicles 100 indicating a rescue intention (excluding depleted EV 101) (step S310). Then, server 200 refers to map information DB 221, and calculates a travel distance between each extracted vehicle 100 and depleted EV 101 (step S320). It should be noted that the processes performed in these steps S310 and S320 are the same as the processes performed in steps S110 and S120 shown in FIG. 9, respectively.

Based on the travel distance between each vehicle 100 and depleted EV 101 calculated in step S320, server 200 temporarily selects vehicle 100 located closest to depleted EV 101 (vehicle 100 having the shortest travel distance to depleted EV 101) as rescue EV 102 to supply power to depleted EV 101 (step S330).

Next, server 200 refers to vehicle information DB 222 and map information DB 221, and searches for a charging station around depleted EV 101 (step S340). Then, server 200 calculates, in consideration of the SOC of power storage device 110 of rescue EV 102 temporarily selected in step S330, and the location of the charging station searched in step S340, a possible power supply amount from rescue EV 102 to depleted EV 101 (step S350).

Specifically, server 200 calculates a power amount that allows rescue EV 102 to travel from the current location of depleted EV 101 to the searched charging station, and calculates a possible power supply amount from rescue EV 102 to depleted EV 101 from the calculated power amount and the SOC (remaining power amount) of rescue EV 102.

It should be noted that the charging station around depleted EV 101 may be a charging station closest to depleted EV 101, or may be selected at rescue EV 102 by presentation to rescue EV 102. As to the calculation of the possible power supply amount of rescue EV 102, server 200 may acquire information indicating power consumption of rescue EV 102 from rescue EV 102 in order to calculate the possible power supply amount, or rescue EV 102 may calculate its own possible power supply amount, and server 200 may acquire a result of the calculation from rescue EV 102.

Next, server 200 calculates, in consideration of the location of the charging station searched in step S340, a power amount requested by depleted EV 101 (step S360). Specifically, server 200 calculates, as the requested power amount of depleted EV 101, a power amount that allows depleted EV 101 to travel from the current location of depleted EV 101 to the searched charging station.

Then, server 200 compares the possible power supply amount of rescue EV 102 calculated in step S350 and the requested power amount of depleted EV 101 calculated in step S360, to determine whether or not depleted EV 101 can be rescued by rescue EV 102 (step S370).

Specifically, when the possible power supply amount of rescue EV 102 is equal to or greater than the requested power amount of depleted EV 101, it is determined that depleted EV 101 can be rescued by rescue EV 102. When the possible power supply amount of rescue EV 102 is smaller than the requested power amount of depleted EV 101, on the other hand, it is determined that depleted EV 101 cannot be rescued by rescue EV 102. That is, it can be said that the aforementioned possible power supply amount is a required power amount for vehicle 100 to be selected as rescue EV 102.

When it is determined in step S370 that depleted EV 101 cannot be rescued by rescue EV 102 (NO in step S370), server 200 temporarily selects, from among vehicles 100 extracted in step S310, vehicle 100 located next closest to depleted EV 101 as rescue EV 102 to supply power to depleted EV 101 (step S390). The process then returns to step S350, and server 200 performs the respective processes from step S350 through step S370 again.

Although not particularly shown, when there is no vehicle 100 that can be temporarily selected as rescue EV 102 in step S390, server 200 may transmit a rescue request to the JAF® or a vehicle dealership, for example, before the process proceeds to the end.

When it is determined in step S370 that depleted EV 101 can be rescued by rescue EV 102 (YES in step S370), on the other hand, server 200 transmits a rescue request (power supply request) to selected rescue EV 102 (step S380). It should be noted that the process performed in step S380 is the same as the process performed in step S140 shown in FIG. 9.

As described above, in this second embodiment, rescue EV 102 is selected in consideration of the location of a charging station around depleted EV 101, such that rescue EV 102 can travel to the nearby charging station after the power supply from rescue EV 102 to depleted EV 101. According to this second embodiment, therefore, a situation where rescue EV 102 cannot travel to the charging station after the completion of the power supply from rescue EV 102 to depleted EV 101 can be avoided.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:
1. A movable body rescue system comprising:
a first movable body equipped with a first power storage device storing electric power for traveling;
a plurality of second movable bodies each equipped with a second power storage device storing electric power for traveling; and
a server configured to communicate with the first movable body and the plurality of second movable bodies, wherein
the first movable body is configured such that the first power storage device can be charged by receiving electric power from any one of the plurality of second movable bodies,
each of the plurality of second movable bodies is configured to supply electric power stored in the second power storage device to the first movable body,
each of the plurality of second movable bodies includes a detection device configured to detect a situation outside the second movable body,
when the server receives from the first movable body a help signal requesting power supply from any one of the plurality of second movable bodies to the first movable body, the server is configured to select, from among the plurality of second movable bodies, a power-supplying movable body to supply electric power to the first movable body, and
the power-supplying movable body is configured to move to the first movable body, stop behind the first movable body detected by the detection device, and supply electric power to the first movable body while being stopped behind the first movable body.
2. The movable body rescue system according to claim 1, wherein
each of the plurality of second movable bodies is configured to transmit to the server a signal indicating whether or not the second movable body can supply electric power to the first movable body, and when the server receives the help signal from the first movable body, the server is configured to select the power-supplying movable body from among second movable bodies each indicating by the signal its ability to supply electric power to the first movable body.

3. The movable body rescue system according to claim 1, wherein when the server receives the help signal from the first movable body, the server is configured to select a second movable body closest to the first movable body of the plurality of second movable bodies as the power-supplying movable body.

4. The movable body rescue system according to claim 1, wherein when the server receives the help signal from the first movable body, the server is configured to select, from among the plurality of second movable bodies, a second movable body storing a prescribed and required power amount in the second power storage device as the power-supplying movable body, and the required power amount is calculated from a stored power amount of the second power storage device, and a power amount that allows travel from a location of power supply to the first movable body to power supply equipment capable of charging the second power storage device.

5. A movable body rescue method used in a system including a first movable body, a plurality of second movable bodies, and a server configured to communicate with the first movable body and the plurality of second movable bodies, wherein the first movable body is equipped with a first power storage device storing electric power for traveling, and is configured such that the first power storage device can be charged by receiving electric power from any one of the plurality of second movable bodies, each of the plurality of second movable bodies is equipped with a second power storage device storing electric power for traveling, and is configured to supply electric power stored in the second power storage device to the first movable body, each of the plurality of second movable bodies includes a detection device configured to detect a situation outside the second movable body, and the rescue method comprises when the server receives from the first movable body a help signal requesting power supply from any one of the plurality of second movable bodies to the first movable body, selecting, from among the plurality of second movable bodies, a power-supplying movable body to supply electric power to the first movable body, moving the power-supplying movable body to the first movable body, stopping the power-supplying movable body behind the first movable body detected by the detection device, and supplying electric power from the power-supplying movable body to the first movable body while the power-supplying movable body is stopped behind the first movable body.

\* \* \* \* \*